(12) United States Patent
Chen et al.

(10) Patent No.: US 10,996,790 B2
(45) Date of Patent: May 4, 2021

(54) TOUCH SYSTEM

(71) Applicant: Silicon Integrated Systems Corp., Hsinchu (TW)

(72) Inventors: Han-Ning Chen, Hsinchu (TW); Shih-Chan Huang, Hsinchu (TW); Chien-Yu Chiang, Hsinchu (TW); Kai-Chun Chuang, Hsinchu (TW); Chih-Sheng Chou, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 16/664,974

(22) Filed: Oct. 28, 2019

(65) Prior Publication Data
US 2020/0142562 A1 May 7, 2020

(30) Foreign Application Priority Data

Nov. 2, 2018 (TW) ................................ 107139051

(51) Int. Cl.
*G06F 3/041* (2006.01)
*G06F 3/044* (2006.01)
*G06F 3/0354* (2013.01)

(52) U.S. Cl.
CPC ...... *G06F 3/04162* (2019.05); *G06F 3/03545* (2013.01); *G06F 3/0441* (2019.05); *G06F 3/0442* (2019.05); *G06F 3/0446* (2019.05); *G06F 2203/04106* (2013.01)

(58) Field of Classification Search
CPC ............. G06F 3/03545; G06F 3/04162; G06F 3/0441; G06F 3/0442; G06F 2203/04106; G06F 3/0446
USPC .......................................... 345/174
See application file for complete search history.

(56) References Cited

U.S. PATENT DOCUMENTS

| | | | |
|---|---|---|---|
| 10,331,235 B2 | 6/2019 | Fleck | |
| 2018/0143703 A1* | 5/2018 | Fleck | ....................... G06F 3/044 |
| 2018/0173330 A1 | 6/2018 | Lee et al. | |
| 2018/0329524 A1* | 11/2018 | Yamamoto | .............. G06F 3/038 |

FOREIGN PATENT DOCUMENTS

| | | |
|---|---|---|
| CN | 107430460 | 12/2017 |
| TW | 201643647 | 12/2016 |
| TW | 201820085 | 6/2018 |

\* cited by examiner

*Primary Examiner* — Mark Edwards

(57) ABSTRACT

A touch system includes a touch panel; an active pen configured to generate a signal; and a touch controller electrically connected to the touch panel and configured to detect the signal. When the touch controller supports at least two protocols, a protocol of the touch controller is automatically switched to one of the at least two protocols. The active pen automatically detects the one of the at least two protocols, and a protocol of the active pen is switched to the one of the at least two protocols.

6 Claims, 4 Drawing Sheets

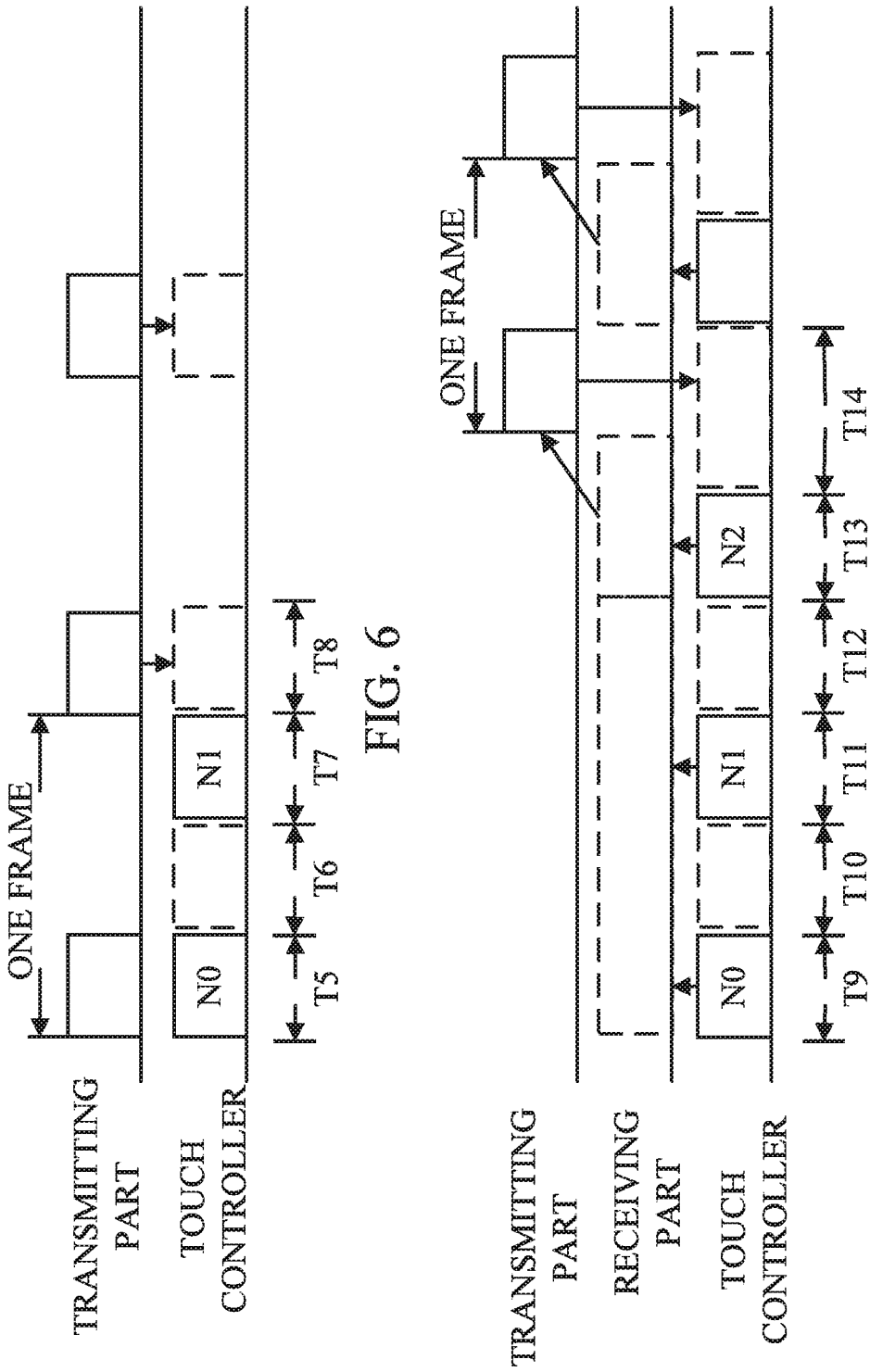

TOUCH SYSTEM

RELATED APPLICATIONS

This application claims the benefit of priority of Taiwan Patent Application No. 107139051 filed on Nov. 2, 2018, the contents of which are incorporated by reference as if fully set forth herein in their entirety.

FIELD AND BACKGROUND OF THE INVENTION

The present disclosure relates to touch control technologies, and more particularly to a touch system.

An active pen is compatible with a touch controller of a touch panel only when a protocol of the active pen is the same as a protocol of the touch controller. However, due to various factors, for example, new products, cost or performance, conventional active pens and touch controllers have various protocols. When the active pens have protocols different from protocols of the touch controllers, the active pens cannot be compatible with the touch controllers. As such, uses of the active pens are limited.

Furthermore, when manufacturers produce active pens having different protocols, it is not convenient for the manufacturers to maintain the active pens having different protocols.

Although there are active pens and touch controllers which can support a plurality of protocols, the touch controllers cannot determine which one has good performance. When the active pens can communicate with the touch controllers via the plurality of protocols, the active pens require switching the protocols by buttons and the touch controllers require switching the protocols by software or buttons. When a situation that the active pens or the touch controllers switch the protocols wrongly or the buttons are touched accidentally occurs, the protocols of the active pens are not compatible with the protocols of the touch controllers. In summary, the touch controllers might only use the protocol via which the touch controllers pair with the active pens successfully for the first time. The touch controllers cannot choose one protocol having the best performance from the protocols.

Therefore, there is a need to solve the above-mentioned problems in the prior art.

SUMMARY OF THE INVENTION

An objective of the present disclosure is to provide a touch system capable of solving the problems in the prior art.

The touch system of the present disclosure includes: a touch panel; an active pen configured to generate a signal; and a touch controller electrically coupled to the touch panel and configured to detect the signal, wherein when the touch controller supports at least two protocols, a protocol of the touch controller is automatically switched to one of the at least two protocols, the active pen automatically detects the one of the at least two protocols of the touch controller, and a protocol of the active pen is switched to the one of the at least two protocols of the touch controller.

The touch system of the present disclosure includes: a touch panel; an active pen configured to generate a signal; and a touch controller electrically coupled to the touch panel and configured to detect the signal, wherein when the touch controller supports at least two protocols, a protocol of the touch controller is automatically switched to one of the at least two protocols to pair with the active pen.

In the touch system of the present disclosure, the active pen can automatically detect the protocol of the touch controller and switch to the protocol of the touch controller, and the touch controller can automatically detect the protocol of the active pen can and switch to the protocol of the active pen can. Furthermore, when the touch controller supports at least two two-way protocols, the touch controller can automatically switch to one of the at least two two-way protocols.

BRIEF DESCRIPTION OF THE SEVERAL VIEWS OF THE DRAWINGS

FIG. 6 illustrates a timing diagram when a protocol of the active pen detected by touch controller is a one-way protocol.

FIG. 7 illustrates a timing diagram when a protocol of the active pen detected by the touch controller is a two-way protocol.

DESCRIPTION OF SPECIFIC EMBODIMENTS OF THE INVENTION

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
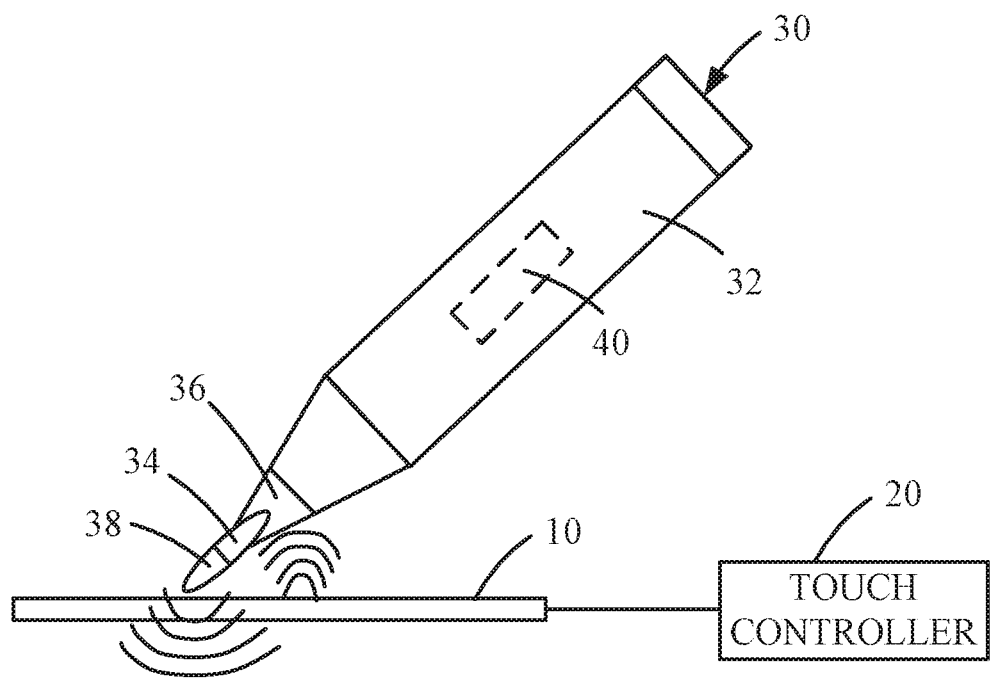
FIG. 1 illustrates a touch system in accordance with an embodiment of the present disclosure.
Figure 2:
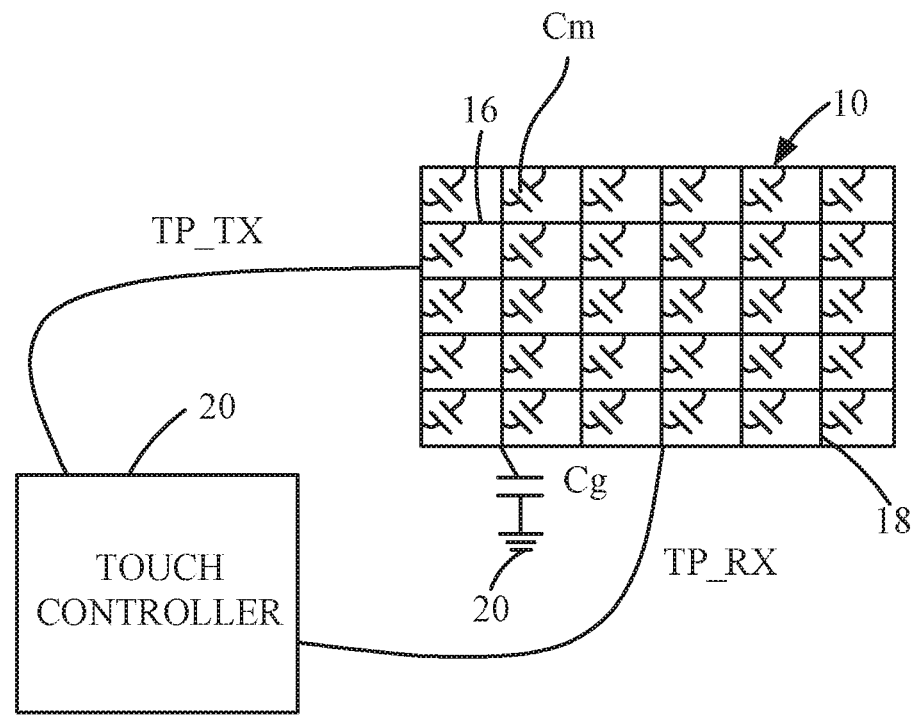
FIG. 2 illustrates a touch panel and a touch controller.

Please refer to FIG. 1 and FIG. 2. FIG. 1 illustrates a touch system in accordance with an embodiment of the present disclosure. FIG. 2 illustrates a touch panel 10 and a touch controller 20.

The touch system includes the touch panel 10, the touch controller 20, and an active pen 30.

The active pen 30 is configured to generate a signal. The touch controller 20 is electrically coupled to the touch panel 10 and configured to detect the signal. The signal, for example, is generated when the active pen 30 touches the touch panel 10. That is, the signal is a touch signal. Alternatively, the signal is generated when the active pen 30 hovers on the touch panel 10. That is, the signal is a hover signal.

Figure 3:
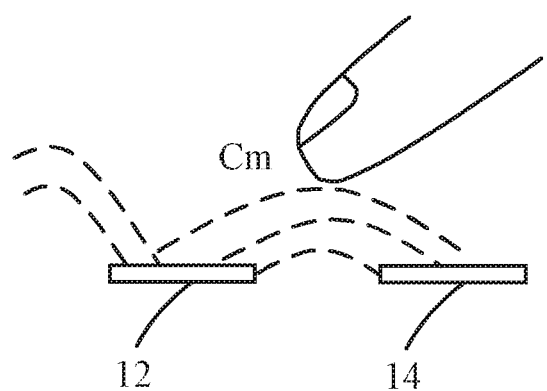
FIG. 3 illustrates that a coupling capacitance is formed between a driving electrode and a sensing electrode of the touch panel.

Please refer to FIG. 1 to FIG. 3. FIG. 3 illustrates that a coupling capacitance (mutual capacitance) Cm is formed between a driving electrode 12 and a sensing electrode 14 of the touch panel 10.

As shown in FIG. 2, the touch panel 10 generally includes a plurality of electrodes arranged in a matrix and a plurality of conductive wires connected to the electrodes. These electrodes are made of indium tin oxide (ITO) and have a bar or diamond shape. In a mutual capacitance framework, these electrodes include a plurality of driving electrodes 12 (as shown in FIG. 3) and a plurality of sensing electrodes 14 (as shown in FIG. 3). Correspondingly, the conductive wires also include a plurality of driving wires 16 and a plurality of sensing wires 18. The driving wires 16 are respectively connected to the corresponding driving electrodes 12. The sensing wires 18 are respectively connected to the corresponding sensing electrodes 14. In a driving scheme of the mutual capacitance framework, a panel driving signal TP_TX (TP represents a Touch Panel) is sequentially applied to the driving electrodes 12 via the driving wires 16. The panel driving signal TP_TX is usually a pulse signal. Correspondingly, a sensing signal TP_RX is read from the sensing electrodes 14 via the sensing wires 18.

As shown in FIG. 1, the active pen 30 (also referred to as active stylus or capacitive pen) can generate similar effect that a finger touches the touch panel 10 in FIG. 1. That is, a capacitance value of the coupling capacitance Cm between the driving electrode 12 and the sensing electrode 14 in FIG. 3 can be changed by the active pen 30. Alternatively, the capacitance value of the coupling capacitance Cm between the driving electrode 12 and the sensing electrode 14 in FIG. 3 can be changed by the hover signal.

The active pen 30 includes a case 32, a transmitting part 34, a receiving part 36, a pressure sensing element 38, and a control unit 40.

The case 32 has a hollow structure. The transmitting part 34 is disposed at a position extending from one end of the case 32 outwardly. The receiving part 36 is disposed in the case 32. The pressure sensing element 38 extends from the transmitting part 34 outwardly. The control unit 40 is disposed in the case 32 and electrically coupled to the transmitting part 34, the receiving part 36, and the pressure sensing element 38.

It is noted that the positions of the transmitting part 34 and the receiving part 36 are not limited to the positions shown in FIG. 1. The transmitting part 34 and the receiving part 36 can be disposed at appropriate positions according to requirements.

Figure 4:
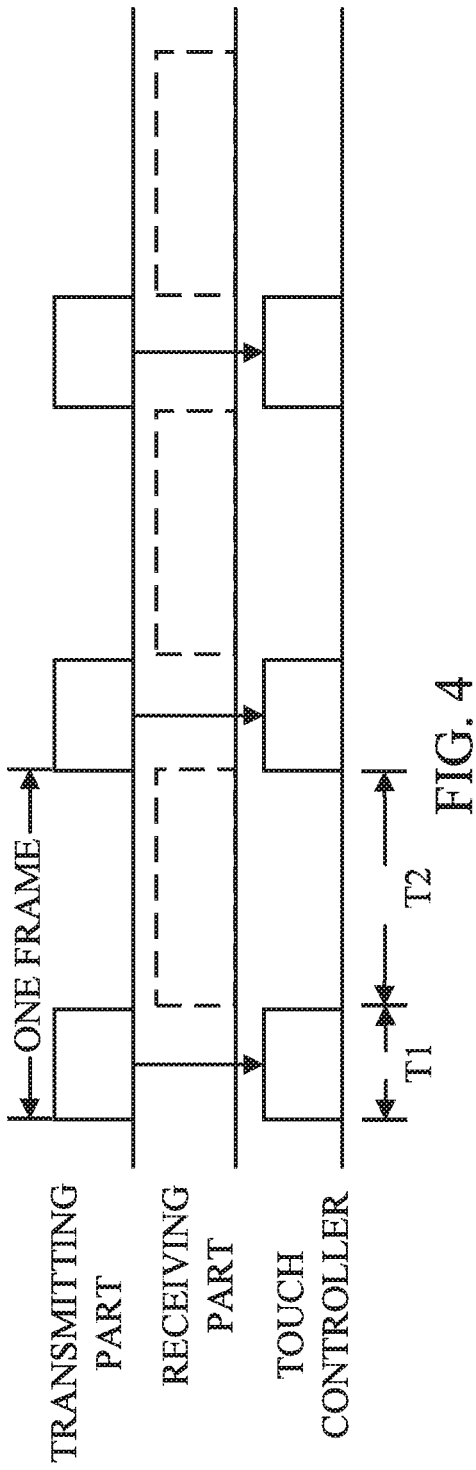
FIG. 4 illustrates a timing diagram when a protocol of the touch controller detected by the active pen is a one-way protocol.
Figure 5:
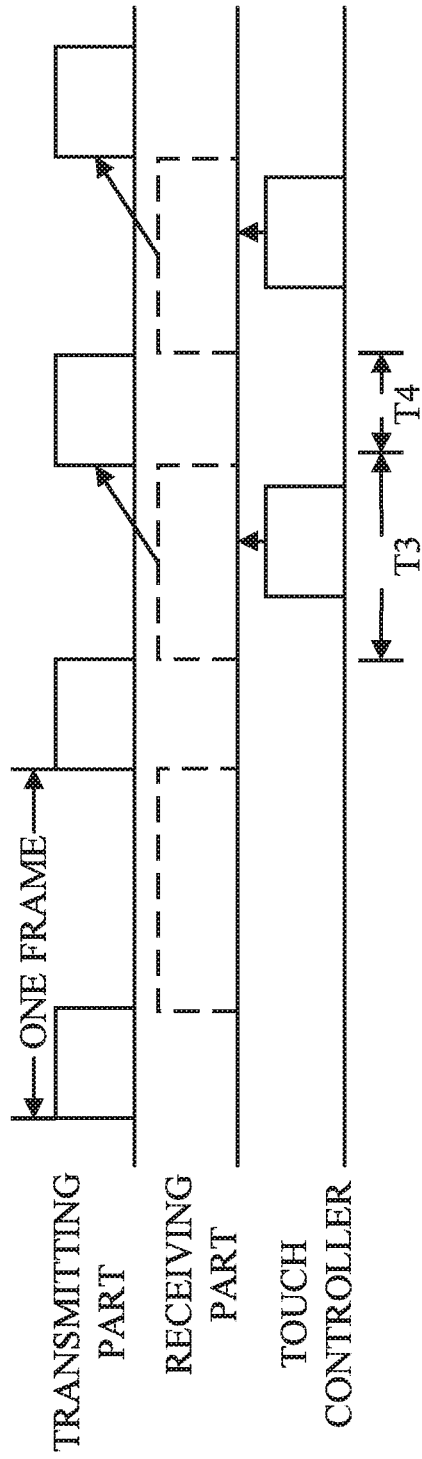
FIG. 5 illustrates a timing diagram when a protocol of the touch controller detected by the active pen is a two-way protocol.

Please refer to FIG. 1 to FIG. 5. FIG. 4 illustrates a timing diagram when a protocol of the touch controller 20 detected by the active pen 30 is a one-way protocol. FIG. 5 illustrates a timing diagram when a protocol of the touch controller 20 detected by the active pen 30 is a two-way protocol.

A feature of the present disclosure is that the active pen 30 can automatically detect the protocol of the touch controller 20 and can switch a protocol of the active pen 30 to the protocol of the touch controller 20. In detail, the active pen 30 can automatically detect that the protocol of the touch controller 20 is the one-way protocol (FIG. 4) or the two-way protocol (FIG. 5). When the protocol of the touch controller 20 is the one-way protocol, it means that the touch controller 20 only receives an active pen signal transmitted by the transmitting part 34 of the active pen 30 and does not transmit a controller signal. When the protocol of the touch controller 20 is the two-way protocol, it means that the touch controller 20 transmits the controller signal having the two-way protocol and receives the active pen signal transmitted by the transmitting part 34 of the active pen 30.

In FIG. 4, the protocol of the touch controller 20 is the one-way protocol. Accordingly, the touch controller 20 does not transmit the controller signal. After the receiving part 36 of the active pen 30 does not receive the controller signal, the transmitting part 34 of the active pen 30 transmits, via the sensing electrodes 14, the active pen signal having the one-way protocol to the touch controller 20 in a period T1. Then, the receiving part 36 of the active pen 30 detects whether the touch controller 20 transmits the controller signal in a period T2. Since the protocol of the touch controller 20 is the one-way protocol, it means that the touch controller 20 does not transmit the controller signal. When the receiving part 36 of the active pen 30 does not receive the controller signal, the controller 40 of the active pen 30 determines that the protocol of the touch controller 20 is the one-way protocol.

In FIG. 5, the protocol of the touch controller 20 is the two-way protocol. Accordingly, the touch controller 20 transmits the controller signal. It is noted that when the protocol of the touch controller 20 is the two-way protocol, the touch controller 20 transmits the control signal firstly.

After the receiving part 36 of the active pen 30 receives, via the driving electrodes 12, the controller signal having the two-way protocol and transmitted by the touch controller 20 in a period T3, the controller 40 of the active pen 30 determines that the protocol of the touch controller 20 is the two-way protocol. The active pen automatically switches to the two-way protocol.

It can be appreciated from FIG. 4 that the active pen 30 can regularly transmit the active pen signal having a specific type of the one-way protocol. Accordingly, the active pen 30 can detect (support) a type of the touch controller having the one-way protocol. It can be appreciated from FIG. 5 that the active pen 30 can transmit plural types of the active pen signals having the two-way protocols. Accordingly, the active pen 30 can detect (support) plural types of the touch controllers having the two-way protocols. In summary, the active pen 30 can support a type of the touch controller having the one-way protocol and plural types of the touch controllers having the two-way protocols.

Furthermore, another feature of the present disclosure is that when the touch controller 20 supports at least two protocols (at least two of a way-one protocol and plural two-way protocols), the touch controller 20 automatically switches to one of the at least two protocols. After the touch controller 20 automatically switches to the one of the at least two protocols, the active pen 30 adaptively and automatically detects the protocol of the touch controller 20 and switches the protocol of the active pen 30 to the one of the at least two protocols of the touch controller 20.

In detail, the touch controller 20 automatically switches, in response to a specific rule, to the one of the at least two protocols. The specific rule includes but is not limited to at least one of a report rate, a pressure level of the pressure sensing element 38 of the active pen 30, a tilt angle, and a power saving level. For example, the touch controller 20 automatically switches to a protocol having a higher report rate. Alternatively, the touch controller 20 automatically switches to a protocol having a higher pressure level. Alternatively, the touch controller 20 automatically switches to a protocol supporting the tilt angle. Alternatively, the touch controller 20 automatically switches to a protocol having a higher power saving level.

Please refer to FIG. 1 to FIG. 3 and FIG. 6 to FIG. 7. FIG. 6 illustrates a timing diagram when a protocol of the active pen 30 detected by touch controller 20 is a one-way protocol. FIG. 7 illustrates a timing diagram when a protocol of the active pen 30 detected by the touch controller 20 is a two-way protocol.

A feature of the present disclosure is that the touch controller 20 can automatically detect that the protocol of the active pen 30 is the one-way protocol (FIG. 6) or the two-way protocol (FIG. 7). In detail, when the protocol of the active pen 30 is the one-way protocol, it means that the active pen 30 only transmits an active pen signal and does not receive a controller signal transmitted by the touch controller 20 and having the one-way protocol. When the protocol of the active pen 30 is the two-way protocol, it means that the active pen 30 transmits the active signal and receives the controller signal transmitted by the touch controller 20 having the two-way protocol.

In FIG. 6, the protocol of the active pen 30 is the one-way protocol. Accordingly, the active pen 30 does not receive the controller signal having the two-way protocol and transmitted by the touch controller 20. The touch controller 20 transmits the controller signal having the two-way protocol (e.g., two-way protocol N0) in a period T5. As mentioned above, the active pen 30 does not receive the controller signal.

The touch controller 20 detects whether the transmitting part 34 of the active pen 30 transmits the active pen signal having the one-way protocol or the two-way protocol in a period T6. Since the transmitting part 34 of the active pen 30 does not transmit the active pen signal having the one-way protocol or the two-way protocol in the period T6, the touch controller 20 does not detect that the transmitting part 34 of the active pen 30 transmits the active pen signal having the one-way protocol or the two-way protocol in the period T6.

The touch controller 20 transmits the controller signal having the two-way protocol (e.g., two-way protocol N1) in a period T7. As mentioned, the active pen 30 does not receive the controller signal.

The touch controller 20 detects whether the transmitting part 34 of the active pen 30 transmits the active pen signal having the one-way protocol or the two-way protocol in a period T8. Since the transmitting part 34 of the active pen 30 transmits the active pen signal having the one-way protocol in the period T8, the touch controller 20 detects that the transmitting part 34 of the active pen 30 transmits the active pen signal having the one-way protocol in the period T8 and the touch controller 20 automatically switches to the one-way protocol in the period T8.

In FIG. 7, the protocol of the active pen 30 is the two-way protocol. Accordingly, the transmitting part 34 of the active pen 30 transmits the active pen signal having the two-way protocol and the receiving part 36 of the active pen 30 receives the controller signal having the two-way protocol and transmitted by the touch controller 20.

The touch controller 20 transmits the controller signal having the two-way protocol (e.g., two-way protocol N0) in a period T9. As mentioned above, the receiving part 36 of the active pen 30 receives the controller signal.

The touch controller 20 detects whether the transmitting part 34 of the active pen 30 transmits the active pen signal having the one-way protocol or the two-way protocol in a period T10. Since the two-way protocol N0 is not a two-way protocol compatible with the active pen 30, the transmitting part 34 of the active pen 30 does not transmit the active pen signal. The touch controller 20 does not detect that the transmitting part 34 of the active pen 30 transmits the active pen signal having the one-way protocol or the two-way protocol in the period T10.

The touch controller 20 transmits the controller signal having the two-way protocol (e.g., two-way protocol N1) in a period T11. As mentioned above, the receiving part 36 of the active pen 30 receives the controller signal.

The touch controller 20 detects whether the transmitting part 34 of the active pen 30 transmits the active pen signal having the one-way protocol or the two-way protocol in a period T12. Since the two-way protocol N1 is not a two-way protocol compatible with the active pen 30, the transmitting part 34 of the active pen 30 does not transmit the active pen signal. The touch controller 20 does not detect that the transmitting part 34 of the active pen 30 transmits the active pen signal having the one-way protocol or the two-way protocol in the period T12.

The touch controller 20 transmits the controller signal having the two-way protocol (e.g., two-way protocol N2) in a period T13. As mentioned above, the receiving part 36 of the active pen 30 receives the controller signal.

The touch controller 20 detects whether the transmitting part 34 of the active pen 30 transmits the active pen signal having the one-way protocol or the two-way protocol in a period T14. Since the two-way protocol N2 is a two-way protocol compatible with the active pen 30, the transmitting part 34 of the active pen 30 transmits the active pen signal having the two-way protocol. The touch controller 20 detects that the transmitting part 34 of the active pen 30 transmits the active pen signal having the two-way protocol in the period T14.

It can be appreciated from FIG. 6 that the touch controller 20 can detect (support) plural types of the active pen signals having the one-way protocols. It can be appreciated from FIG. 7 that the touch controller 20 can transmit plural types of the controller signals having the two-way protocols. Accordingly, the touch controller 20 can detect (support) plural types of the active pens having the two-way protocols. In summary, the touch controller 20 can support plural types of the active pens having the one-way protocols and plural types of the active pens having the two-way protocols.

Furthermore, another feature of the present disclosure is that when the touch controller 20 supports at least two protocols, the touch controller 20 automatically switches to one of the at least two protocols to pair with the active pen 30.

In detail, the touch controller 20 automatically switches, in response to a specific rule, to the one of the at least two protocols (at least two of the plural one-way protocols and the plural two-way protocols). The specific rule includes but is not limited to at least one of a report rate, a pressure level of the pressure sensing element 38 of the active pen 30, a tilt angle, and a power saving level. For example, the touch controller 20 automatically switches to a protocol having a higher report rate. Alternatively, the touch controller 20 automatically switches to a protocol having a higher pressure level. Alternatively, the touch controller 20 automatically switches to a protocol supporting the tilt angle. Alternatively, the touch controller 20 automatically switches to a protocol having a higher power saving level.

In the touch system of the present disclosure, the active pen can automatically detect the protocol of the touch controller and switch to the protocol of the touch controller, and the touch controller can automatically detect the protocol of the active pen can and switch to the protocol of the active pen can. Furthermore, when the touch controller supports at least two two-way protocols, the touch controller can automatically switch to one of the at least two two-way protocols.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A touch system, comprising:
a touch panel;
an active pen configured to generate a signal; and
a touch controller electrically coupled to the touch panel and configured to detect the signal,
wherein when the touch controller supports at least two protocols, a protocol of the touch controller is automatically switched to one of the at least two protocols, the active pen automatically detects the one of the at least two protocols of the touch controller, and a protocol of the active pen is switched to the one of the at least two protocols of the touch controller,
wherein the touch controller automatically switches, in response to a specific rule, to the one of the at least two protocols, and the specific rule comprises at least one of a report rate, a pressure level of the active pen, a tilt angle, and a power saving level,
wherein the active pen automatically detects that the protocol of the touch controller is a one-way protocol or a two-way protocol,
when the protocol of the touch controller is the one-way protocol, the touch controller only receives an active pen signal transmitted by the active pen and does not transmit a controller signal,
when the protocol of the touch controller is the two-way protocol, the touch controller transmits the controller signal having the two-way protocol and receives the active pen signal transmitted by the active pen,
wherein the active pen transmits the active pen signal having a specific type of the one-way protocol to detect a type of the touch controller having the one-way protocol and transmits plural types of the active pen signals having the two-way protocols to detect plural types of the touch controllers having the two-way protocols.

2. The touch system according to claim 1, wherein the active pen transmits the active pen signal having the one-way protocol to the touch controller, and the active pen determines that the protocol of the touch controller is the one-way protocol when the active pen does not receive the controller signal.

3. The touch system according to claim 1, wherein the active pen determines that the protocol of the touch controller is the two-way protocol when the active pen receives the controller signal having the two-way protocol.

4. A touch system, comprising:
a touch panel;
an active pen configured to generate a signal; and
a touch controller electrically coupled to the touch panel and configured to detect the signal,
wherein when the touch controller supports at least two protocols; a protocol of the touch controller is automatically switched to one of the at least two protocols to pair with the active pen,
wherein the touch controller automatically switches, in response to a specific rule, to the one of the at least two protocols, and the specific rule comprises at least one of a report rate, a pressure level of the active pen, a tilt angle, and a power saving level,
wherein the touch controller automatically detects that a protocol of the active pen is a one-way protocol or a two-way protocol,
when the protocol of the active pen is the one-way protocol, the active pen only, transmits an active pen signal and does not receive a controller signal having the two-way protocol,
when the protocol of the active pen is the two-way protocol, the active pen transmits the active pen signal and receives the controller signal having the two-way protocol transmitted by the touch controller,
wherein the touch controller detects plural types of the active pens having the one-way protocols and transmits plural types of the controller signals having the two-way protocols to detect plural types of the active pens having the two-way protocols.

5. The touch system according to claim 4, wherein the active pen transmits the active pen signal having the one-way protocol to the touch controller, and the touch controller determines that the protocol of the active pen is the one-way protocol.

6. The touch system according to claim 4, wherein after the active pen receives the controller signal having the two-way protocol, the touch controller determines that the protocol of the active pen is the two-way protocol when the active pen transmits the active pen signal having the two-way protocol.

* * * * *